Dec. 3, 1968 R. P. HARRIS ETAL 3,414,735

VARIABLE TIME CONSTANT LEARNING MEANS

Filed Dec. 3, 1965

INVENTORS
ROBERT P. HARRIS
JEROME L. KRASNER
MICHAEL KOENIG
BY Charles B. Haverstock
ATTORNEYS United States Patent Office 3,414,735
Patented Dec. 3, 1968

3,414,735

VARIABLE TIME CONSTANT LEARNING MEANS

Robert P. Harris, St. Louis County, Mo., Jerome L. Krasner, Cambridge, Mass., and Michael Koenig, Creve Coeur, Mo., assignors, by mesne assignments, to Conductron Corporation, Ann Arbor, Mich., a corporation of Delaware Filed Dec. 3, 1965, Ser. No. 511,431
16 Claims. (Cl. 307—201)

Figure 1:
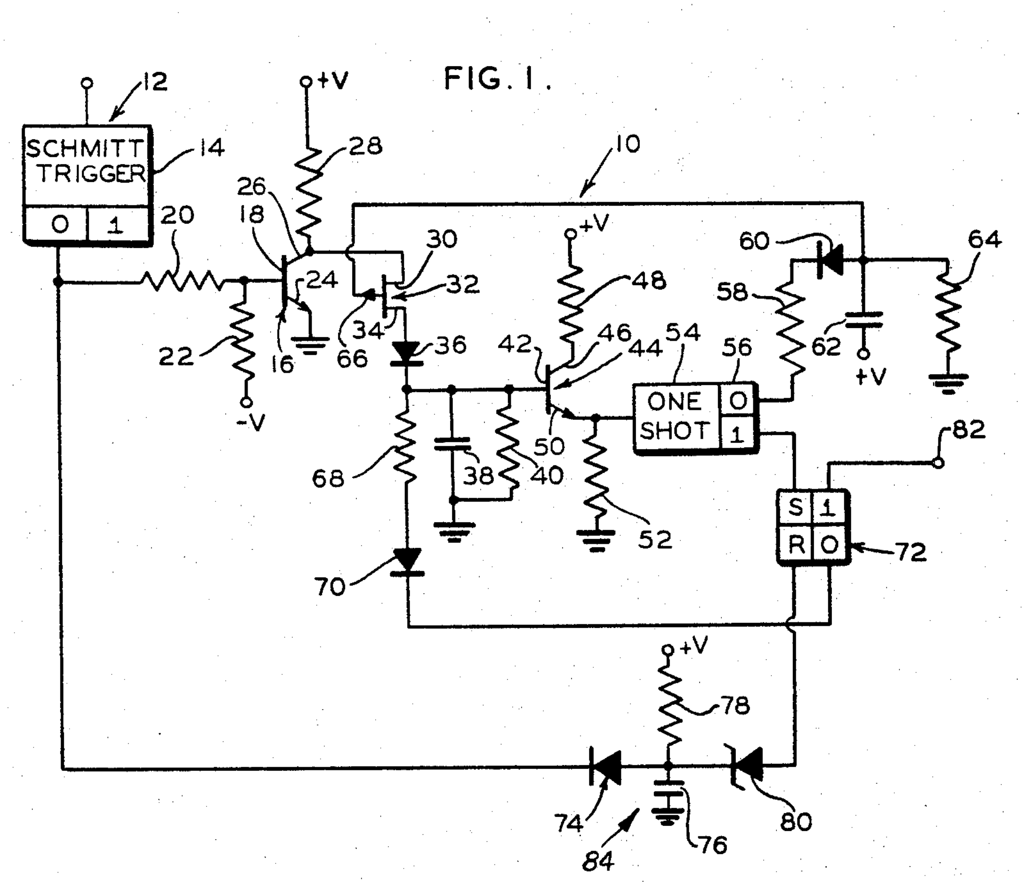

The present invention relates generally to electronic circuits and the like and more particularly to an electronic circuit capable of stimulating human learning processes as distinguished from memory or storage processes. Even more particularly, the invention relates to a circuit capable of learning and forgetting at the same or at different rates, capable of making decisions based on present as well as previously received information or stimulations, and capable of having its learning and/or forgetting rates change or vary in order to more accurately reflect and take into account a history of its past stimulations.

The present invention is an improvement over the device covered by copending Harris and Krasner Patent No. 3,351,783, issued November 7, 1967, assigned to the same assignee, and the present device is able to even more accurately stimulate human learning and forgetting processes.

In the present invention stimulations represented as input signals are used to charge and discharge an integrating circuit or the like, and the outputs of the integrating circuit are used not only in decision making processes but also to change or vary the learning and forgetting rates of the device. This is accomplished by means in the circuit that change the circuit time constant. Any number of such changes of the same or different magnitude can occur depending on the magnitude and frequency of the inputs. For example, each time the charge on the integrator means exceeds a pre-established threshold condition a signal will be produced which will energize another portion of the circuit to change the time constant of the integrator circuit. This in turn will effect the charging and discharging rates of the integrating circuit and hence will also vary the learning and forgetting rates thereof. By so doing, the subject circuit is able to give relatively accurate weight to a past history of inputs in a decision making or other process. The frequency and severity of such past history is also taken into account in a continuous updating process.

The present circuit has a wide range of possible uses and applications and can be made to respond to many different kinds of stimulations some of which may be given greater or lesser effect on the operating and decision making characteristics. The present circuit can also be connected in tandem or parallel with other similar circuits or with circuits like those disclosed in Patent No. 3,351,783 to monitor any desired number of conditions, it can produce outputs for control or warning purposes, it can be used to monitor one or more conditions and can be used to indicate dangerous or potentially dangerous conditions, and the extent of the danger, and it can be used for many other useful purposes.

It is therefore a principal object of the present invention to provide electronic means capable of stimulating learning and forgetting processes.

Another object is to provide means for reliably making decisions based on past as well as present data and for continuously updating information.

Another object is to provide means for weighing information differently depending on the history of information received in the past.

Another object is to provide means for changing the time constant of a learning and forgetting circuit in order to vary the emphasis given to data it receives.

Another object is to provide simulated learning and forgetting means capable of changing its response characteristics depending upon the history of information or stimulations it has received in the past.

Another object is to provide accurate means for evaluating a history of information.

Another object is to provide means capable of simultaneously and continuously monitoring one or more conditions and capable of making decisions based on the characteristics of the conditions being monitored.

Another object is to provide relatively inexpensive yet versatile and reliable means for evaluating a history of information.

Another object is to provide means capable of producing output signals that reflect a composite history of one or more monitored conditions.

Another object is to provide electronic learning means capable of operating on real or stored data and capable of making decisions taking into account current as well as accrued experience due to the past history of stimulations.

Another object is to provide electronic means capable of responding to environmental and other conditions in the manner similar to the way a living body responds thereto.

Another object is to provide means for evaluating a history of data giving preferential weight to data impulses which occur more frequently and to data impulses which exceed pre-established magnitude levels and time durations.

Figure 2:
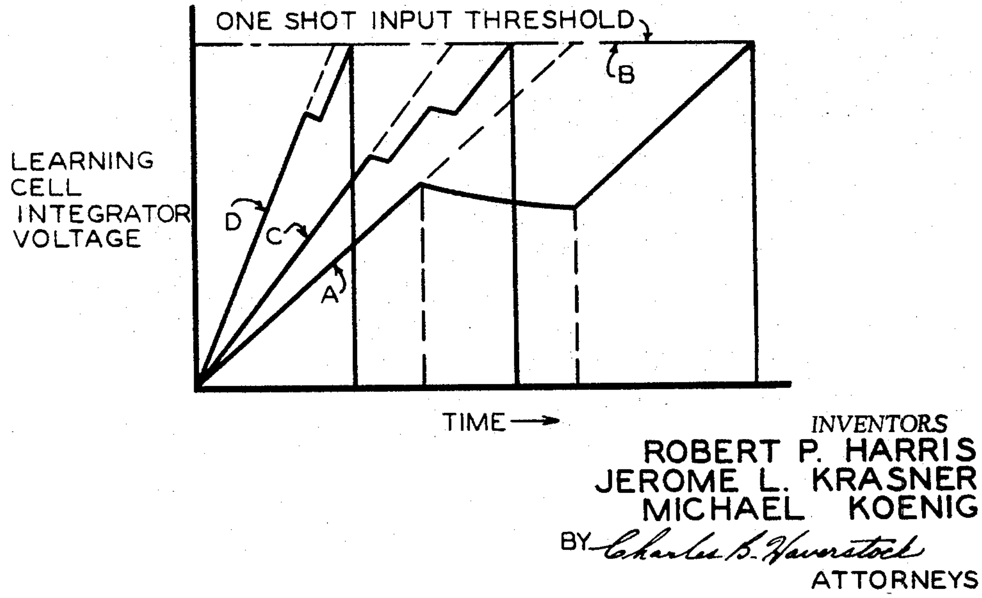

These and other objects and advantages of the invention will become apparent after considering the following detailed specification which covers a preferred embodiment in conjunction with the accompanying drawing, wherein:

FIG. 1 is a schematic diagram of a circuit constructed according to the present invention; and, FIG. 2 is a graph of voltage versus time portraying several different learning and forgetting curves available from the circuit of FIG. 1.

Referring to the drawing more particularly by reference numbers, the number 10 refers to a circuit constructed according to the present invention. The circuit 10 has an input 12 which is shown for illustrative purposes as including Schmitt trigger circuit 14. The input signals to the Schmitt trigger 14 may be in the form of analog voltages or as a sequence of individual impulses of varying magnitude.

The output of the Schmitt trigger 14 is connected to two different circuit channels, one of which includes a transistor 16 connected so that its base element 18 receives signals from the output of the Schmitt trigger 14 through a resistor 20. Another resistor 22 is connected to the transistor base 18 and has its opposite side connected to a negative bias voltage source labeled —V.

The emitter element 24 of the transistor 16 is grounded, and the collector element 26 is biased to a positive operating potential by a positive voltage source +V which is connected thereto through a resistor 28. The collector electrode 26 is the output electrode of the transistor 16 and is also connected to source electrode 30 of a field effect transistor 32. The drain electrode 34 of the field effect transistor 32 acts as the output electrode and is connected to one side of a diode 36 which has its opposite side connected to an integrating circuit formed by capacitor 38 and resistor 40. The field effect transistor 32 when used in this manner acts as a constant current source feeding the integrator. The purpose of transistor 16 is to act as an on-off switch for the constant current source 32.

The transistor 16 is in turn actuated, goes from a normally conducting to a non-conducting condition, each time the threshold level of the trigger device 14 is equaled or exceeded.

The charging and discharging rates of the integrating circuit determine the learning and forgetting characteristics of the circuit and are important to its operation. The functions and operating characteristics of an integrating circuit employed in a learning device such as the present learning device are described in Harris et al. Patent No. 3,351,783. One type of learning and forgetting simulator is described therein. A second form of learning and forgetting is embodied in the improved learning cell detailed herein.

The positive side of the integrating circuit is connected to base electrode 42 of another transistor 44. The collector electrode 46 of the transistor 44 is biased into an operating condition by resistor 48 and positive voltage source +V, and the emitter or output electrode 50 of the transistor 44 is connected to a grounded resistor 52 and also to the input of a "one shot" threshold circuit 54. The threshold circuit 54 includes an output portion 56 labeled "0" which is connected to a circuit that functions when energized to change the operating condition of the field effect transistor 32 and hence the time constant of the integrating circuit. This occurs as will be described whenever the thresheld condition of the circuit 54 is exceeded.

The circuit connected to the threshold output 56 includes a resistor 58, a diode 60, a capacitor 62 and an optional resistor 64 connected as shown. When the threshold of the "one shot" circuit 54 is exceeded by the integrator output at the resistor 52, a negative going signal with respect to +V appears at the diode 60 end of capacitor 62. This signal lasts only for the period of the output of the "one shot" circuit 54. The capacitor 62 thus receives an incremental charge, and the resulting voltage change on the gate electrode 66 of field effect transistor 32 increases the magnitude of the constant current which, on the next triggering of the transistor switch 16, can be fed to the integrating capacitor 38. This constitutes a learning process in that the system is alerted to the previous exceeding of thresholds both at the input 12 and at the resistor 52 and will therefore respond in a stronger manner to the next surpassing of the input threshold at 12. The forgetting, which is the return towards the original capacitor 38 charging current magnitude, is effected by the basic discharge time constant of capacitor 62 and optional resistor 64 as well as by the back biased diode 60 and the input impedance to the gate electrode 66.

The output side of the diode 36 in addition to being connected to the integrating circuit is also connected to another circuit which includes series connected resistor 68 and diode 70. The output side of the diode 70 is connected to the output terminal "0" of a flip-flop circuit 72. The other connections to the flip-flop circuit 72 include a set terminal connection S which is connected to the output terminal "1" of the threshold circuit 54, and reset terminal connection R which is connected through a circuit 84 which includes diode 74, grounded capacitor 76, biasing resistor 78 and Zener diode 80 to the "0" output side of the input Schmitt trigger circuit 14. Whenever the threshold condition of the "one shot" circuit 54 is exceeded a signal will also be available on the set terminal connection S of the flip-flop circuit 72 from the output "1" side of the "one shot" circuit 54, and an output will be available at flip-flop terminal 82. However, when the input signals are not sufficient to exceed the threshold level of the circuit 54, only a relatively short term memory of this will be retained by the integrating circuit and this will decay or be forgotten at a rate dependent on the time constant primarily developed by the capacitor 38 and the resistors 40 and 52.

Whenever an output occurs at the terminal 82 it will be maintained until the flip-flop 72 is reset. Such resetting results from the input stimulus to the Schmitt trigger 14 dropping below the threshold condition for the trigger 14. The inclusion of capacitor 76 in the reset circuit makes resetting less sensitive to negative transients at the input 12 of the Schmitt trigger 14 and also assures that resetting of the flip-flop 72 will not interfere with the circuit of resistor 68 and diode 70 as explained hereinafter. Whenever an output exists at the terminal 82, the charge on the integrating capacitor 38 will decay through a feed back loop which includes the resistor 68 and the diode 70. This causes the charge to decay at an accelerated rate because of the added relatively low impedance introduced into the discharge path. Succeeding occurrences or activations of the learning threshold device 54 will cause further incremental changes in the circuit of the capacitor 62 and the optional resistor 64 and each time this happens the bias on the gate electrode 66 of the field effect transistor 32 is altered and the effect is to incrementally increase the constant current output of the field effect transistor 32 and change the time constant of the circuit. These changes that occur in the field effect transistor 32 are eliminated or forgotten at a rate largely determined by the internal leakage of the capacitor 62 and the optional shunt resistor 64 and to a lesser extent by the back biased diode 60 and the internal impedance of the gate 66. The temperature characteristics of the resistor 64 can be controlled more precisely than the leakage resistance of the capacitor 62. Therefore, the optional resistor 64 can be a major factor both in temperature stability and in the time constant of the circuit formed by the capacitor 62 and resistor 64.

Thus it can be seen that the subject circuit includes means for changing the operating characteristics of the integrating circuit in such a manner as to introduce a variable time constant factor in conjunction with the characteristics of the integrating circuit itself. This enables the present circuit to be able to give greater effect to frequent and prolonged occurrences of a threshold condition than to less frequent and shorter threshold occurrences. Furthermore, if, over a period of time the learning integrator 38 does not reach its output threshold condition, it will slowly forget past inputs and threshold excesses and eventually return to its original discharged condition. The memory of past events stored in capacitor 62 is normally of much longer retention than the memory stored in capacitor 38. When the threshold level at the resistor 52 is equaled or exceeded, the information stored in capacitor 38 is transfered into, and becomes a part of, the memory of past events stored in the capacitor 62.

The present circuit therefore is an improvement over the circuit covered by Harris et al. Patent No. 3,351,783 and is able to do more things primarily because it has the capability of changing its time constant which enables it to give additional and prolonged proportionate emphasis to past history depending on the frequency and severity of past stimulations. The subject circuit therefore substantially increases the versatility and capability of the earlier circuit and is able to more accurately evaluate information.

While it has been necessary to disclose a particular embodiment of the invention it is apparent that many changes, modifications and variations can be made to it without departing from the spirit and scope thereof. For example, the field effect transistor 32 can be operated in its variable resistance region rather than in its constant current region and it can even be replaced with other types of variable resistance elements although it has been found that field effect transistors are satisfactory and have certain advantages including being relatively inexpensive. It is also possible to provide other means than those shown for triggering the flip-flop circuits 72 as well as modifying the reset portion of the flip-flop 72. It is also possible for some purposes to replace the transistor 44 with a diode and the Schmitt trigger 14 with another form of threshold responsive circuit or with a suitable gate circuit. The diode 36 can also be eliminated entirely in many applications. The capacitor 76 and the Zener diode 80 can also be eliminated in certain applications or substituted for by a diode similar to the diode 74 and connected in a circuit between the output terminal 82 and the reset terminal R of the flip-flop circuit 72. In such a modification the diode 74 and the added diode would act as a gate circuit to control the reset of the flip-flop circuit. The above suggested modifications or changes are mentioned for illustrative purposes only and do not represent the full range of possible modification or substitution. In all constructions, however, including the construction chosen for detailed description the same basic operating characteristics are present including the idea of providing simulated electronic learning means having a variable time constant feature.

FIG. 2 is a graph of voltage plotted against time to illustrate how the subject device operates. The voltage plotted is the voltage across the integrating capacitor 38. The line A is is the normal charging rate of the capacitor 38 from a zero charge condition toward the threshold condition B. If an input signal is not of great enough magnitude and long enough duration to charge the capacitor to the threshold condition B, the capacitor will begin to discharge as soon as the input ends but at a relatively slow rate due to the fact that the capacitor discharge path has a relatively high impedance. If, on the other hand, an input signal is sufficient to charge the capacitor 38 to the threshold condition B then the "one shot" threshold circuit 54 will be energized to produce an output as aforesaid which will effect characteristics of the field effect transistor 32 and in so doing will change the circuit time constant. This in turn will change the charging rate and to a much lesser extent the discharging rate of the capacitor 38 in a way which changes the weight given to past inputs and threshold excesses, and it will therefore become progressively easier in time for each succeeding input signal which surpasses threshold level at the input 12 to charge the capacitor 38 to its output threshold condition B. Referring again to FIG. 2 it can be seen that after the threshold level B has once been reached or exceeded the charging rate of the capacitor 38 will be effected by the change in the circuit time constant and will follow line C (or D) in FIG. 2 instead of the line A. If another threshold excess is obtained thereafter still another change in the charging rate will occur, and each time this happens it takes less time for each succeeding input signal to charge the capacitor to its threshold. There is a maximum charging rate boundary depicted by curve D in FIG. 2. After the time constant has once been changed it will very slowly revert to its original condition if no further input threshold level signals across the resistor 52 are received or if the inputs are relatively small in amplitude or infrequent in relation to the then existing circuit time constant. Thus, as in humans, the circuit learns quicker than it forgets.

It is also possible to include means to erase or punish the circuit in order to accelerate the capacitor discharge rate. Such means are disclosed in Harris et al. Patent No. 3,351,783. The present circuit can therefore be constructed to perform all of the functions of the earlier circuit and in addition is more versatile and can be constructed to more accurately simulate a human and other response characteristic because it is able to more accurately make use of a history of past stimulations. The present circuit can also be used to simultaneously monitor many different conditions each of which may have its own characteristics and each of which may or may not be weighted differently. The present circuits can also be connected in tandem or other logic configurations with other similar circuits as well as with circuits such as the circuits covered by Patent No. 3,351,783.

Thus there has been shown and described a novel control circuit capable of accurately simulating learning, forgetting and other processes which fulfills all of the objects and advantages sought therefor. Many changes, modifications, alterations, variations and other uses and applications of the subject device will, however, become apparent to those skilled in the art after considering this specification and the accompanying drawing. All such changes, modifications, alterations, variations and other uses and applications which do not depart from the spirit and scope of the invention are deemed to be covered by the invention which is limited only by the claims which follow.

What is claimed is:

1. Means simulating learning and forgetting processes comprising an electronic circuit having an input adapted to be connected to an input signal source, means connected to said input including means capable of storing a charge at a predetermined charging rate in response to the receipt of input signals, means for dissipating a charge from the charge storing means at times when a previous charge has been stored and when no input signal is present of sufficient magnitude to cause additional charge to be accumulated on said charge storing means, and means responsive to the occurrence of a charge of predetermined magnitude on the charge storing means for changing the charging and discharging rates thereof.

2. The means simulating learning and forgetting processes defined in claim 1 wherein said means for changing the charging rate of the charge storing means include means for changing said rate incrementally each time the charge on the charge storing means equals or exceeds said predetermined magnitude.

3. The means simulating learning and forgetting processes defined in claim 1 wherein said means for changing the discharging rate of the charge storing means includes means for changing the circuit time constant thereof.

4. An electronic circuit including means capable of having a charge stored thereon, means connected to said charge storage means including means for charging said charge storing means at a preestablished charging rate, other means for dissipating a charge from said charge storage means at a charge dissipating rate that is different from the charging rate means responsive to the occurrences of a predetermined charge on said charge storage means, said last named means including means for incrementally changing the charge storage rate of said charge storing means for each occurrence of said predetermined charge thereon.

5. The circuit defined in claim 4 wherein said means for incrementally changing the charge storage rate includes means for changing the circuit time constant thereof.

6. The circuit defined in claim 4 wherein means are provided for accelerating the charge dissipation rate of said charge storage circuit in response to the occurrence of said predetermined charge thereon.

7. Means for simulating learning and forgetting processes comprising a circuit having an input adapted to be connected to a source of input signals, an integrating circuit connected to respond to said input signals and capable of being charged at a preestablished charging rate in response to the receipt of input signals, means for dissipating the charge from the integrating circuit at times when no input signal is present of sufficient magnitude to charge said integrating circuit, means responsive to the occurrence of a charge of predetermined magnitude on said integrating circuit, said last named means including means for incrementally changing the charging rate of said integrating circuit.

8. The means for simulating learning and forgetting processes defined in claim 7 wherein said means for changing the charging rate of the integrating circuit include a constant current device, and means for incrementally changing the operating characteristics of said constant current device every time the charge on the integrating circuit reaches or exceeds said predetermined magnitude.

9. The means for simulating learning and forgetting processes defined in claim 7 wherein said input includes a threshold trigger circuit and means responsive to the output of said trigger circuit for charging the integrator circuit.

10. The means for simulating learning and forgetting processes defined in claim 7 wherein said means for changing the charging rate on the integrating circuit include circuit means responsive to each occurrence of said predetermined charge on the integrating circuit, said circuit means including a constant current device the magnitude of output current of which is changed incrementally every time said predetermined charge occurs on the integrating circuit, and means for changing the time constant of the integrating circuit every time the operating characteristics of the constant current device change.

11. Means for monitoring a variable condition represented by a signal which varies in proportion thereto comprising a circuit having an input adapted to be connected to receive the signals representing the condition being monitored, means connected to respond to the input signals by storing up a charge during the occurrences of said signals, said charge storing means dissipating the charge therefrom during periods when the input signal is insufficient to charge said storing means, means for establishing charging and discharging rates for the signal storing means, and means responsive to each occurrence of a predetermined charge on said charge storing means to change the charging and discharging rates of said means, said last named means including means for changing the circuit time constant of the charge storing means.

12. The monitoring means defined in claim 11 wherein said means for changing the charging and discharging rates of the charge storing means includes a field effect transistor and means for incrementally changing the operating condition of said field effect transistor every time the charge on the charge storing means reaches said predetermined charge condition.

13. A control circuit including an input adapted to be connected to a source of input signals, charge storage means including means for storing charge in response to the receipt of said input signals, means for dissipating a charge from said charge storage means during periods when there is no input signal of sufficient magnitude to charge said charge storage means, the charging and discharging rates of said charge storage means depending on the time constant of the circuit, and means for changing the circuit time constant and the charging and discharging rates of said charge storage means whenever there is a predetermined charge on the charge storage means, said last named means including a monostable circuit adapted to produce a control signal in response to each occurrence of said predetermined charge on the charge storage means, and means responsive to the output signals produced by the mono-stable circuit for incrementally changing the time constant of the charge storage means.

14. The control circuit defined in claim 13 wherein circuit connection means are provided for making the mono-stable circuit responsive to the input signals.

15. The control circuit defined in claim 14 wherein said circuit connection means include a flip-flop circuit having a connection to the mono-stable circuit, a connection to the circuit input, and an output connection.

16. A control circuit for simulating learning and forgetting processes comprising input circuit means including a trigger threshold device connected to a source of input signals, primary electric charge storage means connected to the input circuit means and capable of charging during the receipt of input signals capable of triggering the trigger threshold device, means for dissipating charges stored from said primary storage means at times when no input signal is present of sufficient magnitude to trigger the trigger threshold device, secondary charge storage means operatively connected to the primary storage means, means for transferring a charge to said secondary storage means whenever the charge on the primary storage means reaches a predetermined charge, said secondary charge storage means including means for incrementally changing the charge storing rate of the primary storage means each time a charge is transferred therefrom, and means for dissipating the charge from said secondary charge storage means.

References Cited

UNITED STATES PATENTS

| | | | |
|---|---|---|---|
| 3,007,055 | 10/1961 | Herzfeld | 307—88.5 |
| 3,097,349 | 7/1963 | Putzrath et al. | 340—172.5 |
| 3,204,153 | 8/1965 | Tygart | 317—148.5 |
| 3,233,116 | 2/1966 | Watrous | 307—88.5 |
| 3,351,783 | 11/1967 | Harris et al. | 307—88.5 |

OTHER REFERENCES

"Artificial Neurons—For Machines That Learn" in Electronic Industries by Howard Moraff, pp. 52–56, December 1963.

ARTHUR GAUSS, *Primary Examiner.*

S. D. MILLER, *Assistant Examiner.*